United States Patent
Kang et al.

(10) Patent No.: US 9,799,878 B2
(45) Date of Patent: Oct. 24, 2017

(54) HIGH VOLTAGE POSITIVE ACTIVE MATERIAL AND LITHIUM SECONDARY BATTERY COMPRISING THE SAME

(71) Applicant: LG Chem, Ltd., Seoul (KR)

(72) Inventors: Minsuk Kang, Daejeon (KR); Seong Hoon Kang, Daejeon (KR); Ho Suk Shin, Daejeon (KR); Byung Chun Park, Daejeon (KR); Sang Min Park, Daejeon (KR); Geungi Min, Daejeon (KR)

(73) Assignee: LG Chem, Ltd. (KR)

( * ) Notice: Subject to any disclaimer, the term of this patent is extended or adjusted under 35 U.S.C. 154(b) by 145 days.

(21) Appl. No.: 14/548,747

(22) Filed: Nov. 20, 2014

(65) Prior Publication Data

US 2015/0079473 A1 Mar. 19, 2015

Related U.S. Application Data

(63) Continuation of application No. PCT/KR2013/005788, filed on Jul. 1, 2013.

(30) Foreign Application Priority Data

Jul. 9, 2012 (KR) .......................... 10-2012-0074289

(51) Int. Cl.

| | |
|---|---|
| H01M 4/131 | (2010.01) |
| H01M 4/505 | (2010.01) |
| H01M 4/525 | (2010.01) |
| B60L 11/18 | (2006.01) |
| B60L 3/00 | (2006.01) |
| H01M 4/1315 | (2010.01) |
| H01M 4/485 | (2010.01) |
| H01M 4/1391 | (2010.01) |
| H01M 4/36 | (2006.01) |
| H01M 10/052 | (2010.01) |
| H01M 4/02 | (2006.01) |
| H01M 10/0567 | (2010.01) |
| H01M 10/42 | (2006.01) |

(52) U.S. Cl.
CPC ........... *H01M 4/131* (2013.01); *B60L 3/0046* (2013.01); *B60L 11/185* (2013.01); *B60L 11/1861* (2013.01); *B60L 11/1879* (2013.01); *H01M 4/1315* (2013.01); *H01M 4/1391* (2013.01); *H01M 4/366* (2013.01); *H01M 4/485* (2013.01); *H01M 4/505* (2013.01); *H01M 4/525* (2013.01); *B60L 2240/545* (2013.01); *B60L 2240/547* (2013.01); *B60L 2240/549* (2013.01); *H01M 10/052* (2013.01); *H01M 10/0567* (2013.01); *H01M 10/4235* (2013.01); *H01M 2004/021* (2013.01); *H01M 2004/028* (2013.01); *H01M 2220/20* (2013.01); *Y02E 60/122* (2013.01); *Y02T 10/705* (2013.01); *Y02T 10/7011* (2013.01); *Y02T 10/7044* (2013.01); *Y02T 10/7072* (2013.01); *Y02T 90/121* (2013.01); *Y02T 90/128* (2013.01); *Y02T 90/14* (2013.01)

(58) Field of Classification Search
CPC .... H01M 4/131; H01M 4/366; H01M 4/1391; H01M 4/1315; H01M 4/485; H01M 4/505; H01M 4/525; H01M 10/0567; H01M 10/4235; H01M 10/052; H01M 2220/20; H01M 2004/021; H01M 2004/028; Y02E 60/122; Y02T 90/14; Y02T 90/128; Y02T 90/121; Y02T 10/7072; Y02T 10/7005; Y02T 10/705; Y02T 10/7044; Y02T 10/7011; B60L 11/1861; B60L 11/185; B60L 11/1879; B60L 2240/545; B60L 2240/549; B60L 2240/547; B60L 3/0046

See application file for complete search history.

(56) References Cited

U.S. PATENT DOCUMENTS

| | | |
|---|---|---|
| 2002/0182502 A1 | 12/2002 | Park et al. |
| 2003/0108790 A1 | 6/2003 | Manthiram et al. |
| 2003/0180615 A1 | 9/2003 | Johnson et al. |
| 2006/0134527 A1* | 6/2006 | Amine .................. H01M 4/13 429/326 |
| 2008/0268339 A1 | 10/2008 | Suzuki |
| 2009/0117464 A1 | 5/2009 | Cho et al. |

(Continued)

FOREIGN PATENT DOCUMENTS

| | | |
|---|---|---|
| CN | 1366363 A | 8/2002 |
| CN | 1416189 A | 5/2003 |

(Continued)

OTHER PUBLICATIONS

Zhao et al. (Electrochimica Acta vol. 65—online Jan. 13, 2012 pp. 7-12).*

(Continued)

*Primary Examiner* — Patrick Ryan
*Assistant Examiner* — Aaron Greso
(74) *Attorney, Agent, or Firm* — Lerner, David, Littenberg, Krumholz & Mentlik, LLP

(57) ABSTRACT

Disclosed are a cathode active material for high voltage and a lithium secondary battery including the same. More particularly, a cathode active material including spinel-type compound particles having a composition represented by Formula 1 below;

$$Li_{1+a}M_xMn_{2-x}O_{4-z}A_z \qquad (1)$$

where a, x and z are defined in a specification of the present invention, and metal oxides or metal hydroxides present on surfaces of the spinel-type compound particles, and a lithium secondary battery including the same.

19 Claims, No Drawings

(56) References Cited

U.S. PATENT DOCUMENTS

2009/0220862 A1 9/2009 Toyama et al.
2009/0272939 A1 11/2009 Sun et al.
2013/0146469 A1* 6/2013 Budaragin ............. H01B 1/122
　　　　　　　　　　　　　　　　　　　　　　　205/334

FOREIGN PATENT DOCUMENTS

| CN | 1472828 A | 2/2004 | | |
|---|---|---|---|---|
| CN | 1725534 A | 1/2006 | | |
| CN | 101295788 A | 10/2008 | | |
| CN | 102244257 | * 11/2011 | ............ | H01M 4/505 |
| JP | 200636545 A | 2/2006 | | |
| KR | 2002-0013887 A | 2/2002 | | |
| KR | 2009-0047301 A | 5/2009 | | |
| KR | 2009-0078128 A | 7/2009 | | |
| KR | 2010-0007236 A | 1/2010 | | |
| KR | 20100060363 A | 6/2010 | | |
| WO | 02073717 A1 | 9/2002 | | |
| WO | WO 2012/008480 | * 1/2012 | ............ | C01G 53/00 |
| WO | WO 2012/146961 | * 11/2012 | ............ | H01M 4/36 |

OTHER PUBLICATIONS

Lee et al. Journal of Power Sources 126, 2004, pp. 150-155.*
International Search Report from PCT/KR2013/005788, dated Sep. 30, 2013.
Sun, et al., "Electrochemical performance of nano-sized ZnO-coated LiNi0.5Mn1.5 spinel as 5 V materials at elevated temperatures," Electrochemistry Communications 4 (2002) 344-348.

* cited by examiner

HIGH VOLTAGE POSITIVE ACTIVE MATERIAL AND LITHIUM SECONDARY BATTERY COMPRISING THE SAME

CROSS-REFERENCE TO RELATED APPLICATIONS

The present application is a continuation of International Application No. PCT/KR2013/005788 filed Jul. 1, 2013, which claims priority from Korean Patent Application No. 10 2012 0074289filed Jul. 9, 2012, the disclosures of which are hereby incorporated herein by reference.

TECHNICAL FIELD

The present invention relates to a cathode active material for high voltage and a lithium secondary battery including the same. More particularly, the present invention relates to a cathode active material including spinel-type compound particles having a composition represented by Formula 1 below; and metal oxides or metal hydroxides present on surfaces of the spinel-type compound particles, and a lithium secondary battery including the same.

$$Li_{1+a}M_xMn_{2-x}O_{4-z}A_z \quad (1)$$

where a, x and z are defined in a specification of the present invention.

BACKGROUND ART

In line with development of information technology (IT), various portable information and communication devices have entered widespread use and thus the 21$^{st}$ century is developing into a "ubiquitous society" where high quality information services are available regardless of time and place.

Lithium secondary batteries play a key role in such development towards the ubiquitous society.

Lithium secondary batteries have higher operating voltage and energy density and are used for a longer period of time than other secondary batteries and thus can satisfy sophisticated requirements according to diversification and increasing complexity of devices.

Recently, much effort globally has been put into expanding applications to eco-friendly transportation systems such as electric vehicles and the like, power storage, and the like through further advancement of conventional lithium secondary batteries.

Secondary batteries used as a power source of medium and large devices such as electric vehicles or energy storage systems (ESS) require high output, high energy density and high energy efficiency. Although $LiMn_2O_4$ has advantages such a low price, high output and the like, energy density thereof is low, when compared to a lithium cobalt oxide.

DISCLOSURE

Technical Problem

The inventors of the present invention confirmed that, in a process developing a compound in which some manganese (Mn) of $LiMn_2O_4$ is substituted with a metal such as nickel (Ni) or the like to improve low energy density characteristics of $LiMn_2O_4$ having an operating potential of around 4 V (approximately 3.7 V to 4.3 V), the compound, some manganese of which is substituted with a metal such as nickel or the like, has a high operating potential of 4.6 V or more, and thereby an electrolyte is decomposed even in a normal operating range of a battery and battery performance is deteriorated due to side reaction with the electrolyte. Such a problem was not observed in $LiMn_2O_4$ having an operating voltage of around 4 V.

Therefore, the present invention aims to resolve the above problem, and to provide a cathode material for a high voltage of a 5 V class and a method of preparing the same.

Technical Solution

In accordance with one aspect of the present invention, provided is a cathode active material including spinel-type compound particles having a composition represented by Formula 1 below; and metal oxides or metal hydroxides present on surfaces of the spinel-type compound particles.

$$Li_{1+a}M_xMn_{2-x}O_{4-z}A_z \quad (1)$$

wherein M is at least one selected form the group consisting of Ni, Ti, Co, Al, Cu, Fe, Mg, B, Cr, Zr, Zn and Period II transition metals;

A is a monovalent anion or divalent anion; and $-0.1 \leq a \leq 0.1$, $0.3 \leq x \leq 0.8$, and $0 \leq z \leq 0.1$.

The spinel-type compound of Formula 1 is different from $LiMn_2O_4$ having an operating potential of around 4 V (approximately 3.7 V to 4.3 V) in that the spinel-type compound of Formula 1 has an operating potential of 4.6 V or more and 4.9 V or less.

Therefore, the spinel-type compound of Formula 1 may exhibit high energy density characteristics, when compared to $LiMn_2O_4$.

The metal oxide or the metal hydroxide may physically and/or chemically combine with a surface of the spinel-type compound.

The metal oxide or the metal hydroxide may entirely or partially cover surfaces of the spinel-type compound particles. In particular, 20% or more and 100% or less of surfaces of the spinel-type compound particles may be covered. As a non-limiting embodiment, 50% or more and 80% or less of entire surfaces of the spinel-type compound particles may be covered. Due to surface energy change of a portion covered with the metal oxide or the metal hydroxide, elution of manganese may be suppressed.

The metal oxide or the metal hydroxide functions as a protective layer to suppress reaction with an electrolyte. The protective layer may suppress side reaction of an electrolyte by blocking direct contact between an electrolyte and the compound of Formula 1 during charging and discharging at high voltage. As a result, the cathode active material according to the present invention may exhibit stable charge and discharge cycle characteristics and, as such, reversible charge and discharge capacity may be increased.

As a non-limiting embodiment of the present invention, the compound of Formula 1 may be a compound of Formula 2 below.

$$Li_{1+a}Ni_bM_cMn_{2-(b+c)}O_{4-z}A_z \quad (2)$$

wherein M is at least one selected from the group consisting of Ti, Co, Al, Cu, Fe, Mg, B, Cr, Zr, Zn and Period II transition metals;

A is a monovalent anion or a divalent anion and is independently at least one selected from the group consisting of a halogen such as F, Cl, Br, I or the like, S, and N; and $-0.1 \leq a \leq 0.1$, $0.3 \leq b \leq 0.6$, $0 \leq c \leq 0.2$, and $0 \leq z \leq 0.1$.

The metal oxide or the metal hydroxide may be an oxide or a hydroxide of at least one metal selected from the group consisting of Al, Mg, Ni, Co, Ti, Cr, Mo, Bi, Zn, Zr, Ru and W.

As one specific embodiment, the metal oxide or the metal hydroxide may be adhered to surfaces of spinel-type compound particles in a particle form. In this regard, an average diameter (D50) of the metal oxide particles or the metal hydroxide particles maybe 20 nm or more and 1000 nm or less.

When the average diameter (D50) is less than 20 nm, elution of manganese and side reaction with an electrolyte may not be effectively suppressed, and when the average diameter (D50) exceeds 1000 nm, the metal oxide particles or the metal hydroxide particles block diffusion pathways of lithium ions and, as such, high rate characteristics may be deteriorated.

As another specific embodiment, a metal oxide film or a metal hydroxide film may be formed on the surfaces of spinel-type compound particles. When the metal oxide film or the metal hydroxide film is formed on entire surfaces of the spinel-type compound particles, the cathode active material according to the present invention has a core-shell structure.

The thickness of metal oxide or the metal hydroxide film may be 50 nm or more and 500 nm or less. When the film has a thickness of less than 50 nm, elution of manganese and side reaction with an electrolyte may not be effectively suppressed, and when the thickness of the film exceeds 500 nm, the metal oxide film or the metal hydroxide film increases resistance and, as such, high rate characteristics may be deteriorated.

The cathode active material according to the present invention may be prepared through a liquid method of preparing a coating liquid and then mixing the coating liquid with a cathode material, a mechanochemical method using high mechanical energy of ball milling, a fluid-bed coating method, a spray drying method, a precipitation method of precipitating a coating material on a surface of an active material in an aqueous solution state, a method using reaction between a coating material in a gaseous state and a cathode material, a sputtering method, a mechanofusion method using static electricity or the like.

As one specific embodiment, the cathode active material according to the present invention may be prepared by wet-mixing a spinel-type compound having the composition represented by Formula 1 with a metal oxide precursor or a metal hydroxide precursor and then by drying.

As another specific embodiment, the cathode active material according to the present invention may be prepared by dry-mixing a spinel-type compound having the composition represented by Formula 1 with a metal oxide precursor or a metal hydroxide precursor and then heat-treating the same.

The cathode active material according to the present invention may be mixed with other lithium-containing transition metal oxides besides the cathode active material.

Examples of other lithium-containing transition metal oxides include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ where $0 \leq y \leq 0.33$, $LiMnO_3$, $LiMn_2O_3$, and $LiMnO_2$; lithium copper oxide ($Li_2CuO_2$); vanadium oxides such as $Li\ V_3O_8$, $Li\ V_3O_4$, $V_2O_5$, and $Cu_2V_2O_7$; Ni-site type lithium nickel oxides having the formula $LiNi_{1-y}M_yO_2$ where M=Co, Mn, Al, Cu, Fe, Mg, B, or Ga, and $0.01 \leq y \leq 0.3$; lithium manganese composite oxides having the formula $LiMn_{2-y}M_yO_2$ where M=Co, Ni, Fe, Cr, Zn, or Ta, and $0.01 \leq y \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; and $Fe_2(MoO)_3$.

A cathode may be manufactured by coating, on a cathode current collector, a slurry prepared by mixing a cathode mixture including the cathode active material and a solvent such as NMP or the like and drying and rolling the coated cathode current collector The cathode mixture may selectively include a conductive material, a binder, a filler, and the like, in addition to the cathode active material.

The cathode current collector is generally fabricated to a thickness of 3 to 500 μm. The cathode current collector is not particularly limited so long as it does not cause chemical changes in the fabricated battery and has high conductivity. For example, the cathode current collector may be made of copper, stainless steel, aluminum, nickel, titanium, sintered carbon, or copper or stainless steel surface-treated with carbon, nickel, titanium, silver, aluminum-cadmium alloys, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 30 wt % based on the total weight of a mixture including a cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be added in an amount of 1 wt % to 30 wt % based on the total weight of a mixture including a cathode active material. Non-limiting examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

As a dispersion solution, isopropyl alcohol, N-methylpyrrolidone (NMP), acetone, or the like may be used.

A method of uniformly coating a metal material with a paste of an electrode material may be selected from among known methods or an appropriate new method in consideration of properties and the like of materials. For example, a paste may be applied to a current collector and then uniformly dispersed thereon using a doctor blade or the like. In some cases, the application and dispersing processes may be simultaneously performed as a single process. In addition, die casting, comma coating, screen-printing, or the like may be used. In another embodiment, a paste of an electrode material may be molded on a separate substrate and adhered to a current collector by pressing or lamination.

The paste coated on the metal material, e.g., a metal plate, may be dried in a vacuum oven at 50° C. to 200° C. for one day.

The anode may be manufactured by, for example, coating an anode active material on an anode current collector and drying the coated anode current collector. As desired, as described above, components such as a conductive material, a binder, a filler, and the like may be selectively further added to the anode active material.

The anode current collector is typically fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. As in the cathode current collector, the anode current collector may have fine irregularities at a surface thereof to enhance adhesion between the anode current collector and the anode active material. In addition, the anode current collector may be used in various forms including films, sheets, foils, nets, porous structures, foams, and non-woven fabrics.

Examples of the anode active material include, but are not limited to, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, Group II and Group III elements, or halogens; $0 \leq x \leq 1$; $1 \leq y \leq 3$; and $1 \leq z \leq 8$; lithium metal; lithium alloys; Si-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

A separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics, made of an olefin polymer such as polypropylene, glass fibers or polyethylene, which have chemical resistance and hydrophobicity, or kraft papers are used. Examples of commercially available separators include, but are not limited to, Celgard$^R$ series such as Celgard$^R$ 2400 and 2300 (available from Hoechest Celanese Corp.), polypropylene separators (available from Ube Industries Ltd., or Pall RAI Co.), and polyethylene series (available from Tonen or Entek).

In some cases, to enhance battery stability, a gel polymer electrolyte may be coated on the separator. Examples of such gel polymers include, but are not limited to, polyethylene oxide, polyvinylidenefluoride, and polyacrylonitrile.

When a solid electrolyte such as a polymer or the like is used as an electrolyte, the solid electrolyte may also serve as both the separator and electrolyte.

A lithium salt-containing non-aqueous electrolyte is composed of a non-aqueous electrolyte and a lithium salt. As the non-aqueous electrolyte, a non-aqueous electrolytic solution, an organic solid electrolyte, or an inorganic solid electrolyte may be used.

For example, the non-aqueous electrolytic solution may be an aprotic organic solvent such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

In the lithium secondary battery according to the present invention, initial charge and discharge efficiency measured after charging and discharging once in a voltage range of 3.5 to 4.9 V at a current of 0.1 C may be 95% or more.

In addition, in the lithium secondary battery according to the present invention, high charge efficiency measured while charging at a current of 5.0 C after charging and discharging at a current of 0.1 C may be 86% or more. As one non-limiting embodiment of the present invention, the high charge efficiency may be 90% or more.

In addition, the lithium secondary battery according to the present invention, lifespan characteristics measured by charging and discharging one hundred times at a current of 1.0 C 100 may be 92% or more.

In addition, in the lithium secondary battery according to the present invention, the amount of manganese eluted in an electrolyte may be 60 ppm or more and less than 280 ppm. As one non-limiting embodiment of the present invention, the amount of manganese may be less than 80 ppm or more and less than 250 ppm. In addition, as one non-limiting embodiment of the present invention, the amount of manganese may be 90 ppm or more and less than 200 ppm.

The amount of manganese eluted in the electrolyte may be measured with an inductively coupled plasma optical emission spectrometer after charging and discharging a battery once at a current of 0.1 C in a voltage range of 3.5 to 4.9 V and then decomposing a battery by charging to 4.9 V at a current of 0.1 C, soaking a cathode obtained from the decomposed battery in a container containing 15 ml of a liquid electrolyte including 1 M $LiPF_6$ dissolved in a solvent in which ethylene carbonate, dimethyl carbonate and diethyl carbonate were mixed in a ratio of 1:2:1, and storing in a 80 constant-temperature bath for two weeks, sequentially.

The secondary battery according to the present invention may be used in a battery cell used as a power source of small devices and may also be used as a unit cell of a medium and large-scale battery module including a plurality of battery cells.

The present invention also provides a battery pack including the battery module as a power source of a medium and large-scale device. Examples of the medium and large-scale device include, but are not limited to, electric vehicles (EVs), hybrid EVs (HEVs), and plug-in HEVs (PHEVs); and devices for storing power.

MODE FOR INVENTION

Now, the present invention will be described in more detail with reference to the following examples. These examples are provided only for illustration of the present invention and should not be construed as limiting the scope and spirit of the present invention.

EXAMPLE 1

After mixing $LiNi_{0.5}Mn_{1.5}O_4$ as a cathode material with 0.2 wt % of 70 nm magnesium oxide, a resulting mixture was inserted into an agitator (Noblita™ available from HOSOKAWA MICRON) and then was mixed for one hour at a rate of 1000 rpm. Subsequently, a resulting mixture was heat-treated for five hours at 400 in the atmosphere state to prepare $LiNi_{0.5}Mm_{1.5}O_4$ surface-modified with a magnesium oxide.

The surface-modified $LiNi_{0.5}Mn_{1.5}O_4$: a conductive material:a binder of 95:2.5:2.5 were weighed and then mixed in NMP to prepare a cathode mixture, which was then coated on aluminum foil having a thickness of 20 μm. The coated cathode mixture was pressed and then dried, resulting in a cathode.

The cathode for lithium secondary batteries, a lithium metal film as an opposite electrode (i.e., anode), a polyethylene film (Celgard, thickness: 20 μm) as a separator, a liquid electrolyte including 1 M $LiPF_6$ dissolved in a solvent in which ethylene carbonate, dimethyl carbonate and diethyl carbonate were mixed in a ratio of 1:2:1 were used to manufacture a 2016 coin cell.

EXAMPLE 2

A 2016 coin cell was manufactured in the same manner as in Example 1, except that 50 nm aluminum oxide was used instead of the magnesium oxide of Example 1.

EXAMPLE 3

A 2016 coin cell was manufactured in the same manner as in Example 1, except that an aluminum hydroxide of 120 nm was used instead of the magnesium oxide of Example 1.

COMPARATIVE EXAMPLE 1

A 2016 coin cell was manufactured using $LiNi_{0.5}Mn_{1.5}O_4$, in which the surface modification process according to Example 1 was not carried out, as a cathode material.

COMPARATIVE EXAMPLE 2

A 2016 coin cell was manufactured in the same manner as in Example 1, except that 2 μm magnesium oxide of was used instead of the magnesium oxide of Example 1.

EXPERIMENTAL EXAMPLE 1

Initial Charge and Discharge Characteristics

Charge and discharge characteristics of the coin cell manufactured according to each of Examples 1 to 3,and Comparative Examples 1 and 2 were measured by charging and discharging once at a current of 0.1 C in a voltage range of 3.5 to 4.9 V. Results are summarized in Table 1 below.

TABLE 1

| | Initial charge efficiency (mAh/g) | Initial discharge capacity (mAh/g) | Initial charge and discharge efficiency (%) |
|---|---|---|---|
| Example 1 | 147.6 | 142.1 | 96.3 |
| Example 2 | 148.2 | 142.0 | 95.8 |
| Example 3 | 147.9 | 141.1 | 95.4 |
| Comparative Example 1 | 147.3 | 138.6 | 94.1 |
| Comparative Example 2 | 142.5 | 129.4 | 90.8 |

EXPERIMENTAL EXAMPLE 2

High Speed Charge Characteristics

The coin cell manufactured according to each of Examples 1 to 3,and Comparative Examples 1 and 2 was charged and discharged at a current of 0.1 C, and then was charged at a current of 5.0 C to measure high speed charge characteristics. Results are summarized in Table 2 below.

TABLE 2

| | Charge capacity at 0.1 C (mAh/g) | Charge capacity at 5 C (mAh/g) | High speed charge efficiency 5.0 C/0.1 C (%) |
|---|---|---|---|
| Example 1 | 147.6 | 132.1 | 89.5 |
| Example 2 | 148.2 | 134.0 | 90.4 |
| Example 3 | 147.9 | 134.6 | 91.0 |
| Comparative Example 1 | 147.3 | 125.6 | 85.3 |
| Comparative Example 2 | 142.5 | 115.0 | 80.7 |

EXPERIMENTAL EXAMPLE 3

Lifespan Characteristics

The coin cell manufactured according to each of Examples 1 to 3, and Comparative Examples 1 and 2 was charged and discharged one hundred times at a current of 1.0 C 100 to measure lifespan characteristics. Results are summarized in Table 3 below.

TABLE 3

| | Lifespan characteristics 100$^{th}$/1$^{st}$ discharge capacity (%) |
|---|---|
| Example 1 | 98.4 |
| Example 2 | 96.7 |
| Example 3 | 94.2 |
| Comparative Example 1 | 91.8 |
| Comparative Example 2 | 84.5 |

EXPERIMENTAL EXAMPLE 4

Measurement of Amount of Eluted Manganese

The coin cell manufactured according to each of Examples 1 to 3, and Comparative Examples 1 and 2 was charged and discharged once at a current of 0.1 C in a voltage range of 3.5 to 4.9 V, and then was charged to 4.9 V at a current of 0.1 C to decompose the coin cell. A cathode obtained from the decomposed coin cell was soaked in a container containing 15 mL of electrolyte and then was stored for two weeks in an 80 constant-temperature bath. Subsequently, the amount of manganese eluted in an electrolyte was measured using an ICP (model No. 7100 available from PerkinElmer).

TABLE 4

| | Measurement of amount of eluted manganese (ppm) |
|---|---|
| Example 1 | 137 |
| Example 2 | 164 |
| Example 3 | 91 |
| Comparative Example 1 | 280 |
| Comparative Example 2 | 59 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention provides a lithium secondary battery for high voltage by partially or entirely adhering metal oxide particles or metal hydroxide particles to surfaces of spinel-type compound particles of Formula 1, or by forming a metal oxide film or a metal hydroxide film on the surfaces of the spinel-type compound particles of Formula 1, so as to suppress side reaction of an electrolyte and elution of manganese at a high voltage.

The invention claimed is:

1. A cathode active material comprising spinel-type compound particles having a composition represented by Formula 1:

$$Li_{1+a}M_xMn_{2-x}O_{4-z}A_z \qquad (1)$$

wherein M is at least one selected form the group consisting of Ni, Ti, Co, Al, Cu, Fe, Mg, B, Cr, Zr, and Zn;
A is a monovalent anion or divalent anion; and
$-0.1 \leq a \leq 0.1$, $0.3 \leq x \leq 0.8$, and $0 \leq z \leq 0.1$; and
wherein the spinel-type compound particles have a surface layer of metal oxides or metal hydroxides, the metal oxides or the metal hydroxides are oxides or hydroxides of at least one metal selected from the group consisting of Al, Mg, Ni, Co, Ti, Cr, Mo, Bi, Zn, Zr, Ru and W, and
wherein the metal oxides or the metal hydroxides adhere to surfaces of spinel-type compound particles in a particle form and wherein the metal oxides or the metal hydroxides cover from about 50% to about 80% of an overall surface of a spinel-type compound represented by Formula 1.

2. The cathode active material according to claim 1, wherein the spinel-type compound is a compound represented by Formula 2 below:

$$Li_{1+a}Ni_bM_cMn_{2-(b+c)}O_{4+z}A_z \qquad (2)$$

wherein M is at least one selected from the group consisting of Ti, Co, Al, Cu, Fe, Mg, B, Cr, Zr, and Zn;
A is a monovalent anion or divalent anion; and
$-0.1 \leq a \leq 0.1$, $0.3 \leq b \leq 0.6$, $0 \leq c \leq 0.2$, and $0 \leq z \leq 0.1$.

3. The cathode active material according to claim 1, wherein A independently is at least one selected from the group consisting of a halogen such as F, Cl, Br, I and the like, S, and N.

4. A cathode active material comprising spinel-type compound particles having a composition represented by Formula 1:

$$Li_{1+a}M_xMn_{2-x}O_{4-z}A_z \qquad (1)$$

wherein M is at least one selected form the group consisting of Ni, Ti, Co, Al, Cu, Fe, Mg, B, Cr, Zr, Zn and Period II transition metals;
A is a monovalent anion or divalent anion; and
$-0.1 \leq a \leq 0.1$, $0.3 \leq x \leq 0.8$, and $0 \leq z \leq 0.1$; and
wherein a metal oxide film or a metal hydroxide film is formed on the surfaces of spinel-type compound particles, the metal oxides or the metal hydroxides are oxides or hydroxides of at least one metal selected from the group consisting of Al, Mg, Ni, Co, Ti, Cr, Mo, Bi, Zn, Zr, Ru and W, wherein the metal oxide film or the metal hydroxide film is formed on entire surfaces of the spinel-type compound particles to form a core-shell structure.

5. The cathode active material according to claim 1, wherein the metal oxide or the metal hydroxide physically and/or chemically combines with a surface of the spinel-type compound.

6. The cathode active material according to claim 1, wherein an average diameter (D50) of the metal oxides or the metal hydroxide particles is 20 nm to 1000 nm.

7. The cathode active material according to claim 4, wherein the metal oxide or the metal hydroxide film has a thickness of 50 nm to 500 nm.

8. The cathode active material according to claim 1, wherein the cathode active material is prepared by wet-mixing and drying a spinel-type compound having a composition represented by Formula 1 and a metal oxide precursor or a metal hydroxide precursor.

9. The cathode active material according to claim 1, wherein the cathode active material is prepared by dry-mixing and heat-treating a spinel-type compound having a composition represented by Formula 1 and a metal oxide precursor or a metal hydroxide precursor.

10. A lithium secondary battery comprising the cathode active material according to claim 1.

11. The lithium secondary battery according to claim 10, wherein initial charge and discharge efficiency measured after charging and discharging once at a current of 0.1 C in a voltage range of 3.5 to 4.9 V is 95% or more.

12. The lithium secondary battery according to claim 10, wherein high speed charge efficiency measured by charging at a current of 5.0 C after charging and discharging at a current of 0.1 C is 86% or more.

13. The lithium secondary battery according to claim 12, wherein the high speed charge efficiency is 90% or more.

14. The lithium secondary battery according to claim 10, wherein lifespan characteristics measured by charging and discharging one hundred times at a current of 1.0 C are 92% or more.

15. The lithium secondary battery according to claim 10, wherein, after decomposing a battery by charging to 4.9 V at a current of 0.1 C after charging and discharging once at a current of 0.1 C in a voltage range of 3.5 to 4.9 V, and then soaking a cathode obtained from the decomposed battery in a container containing 15 ml of a liquid electrolyte comprising 1 M $LiPF_6$ dissolved in a solvent in which ethylene carbonate, dimethyl carbonate and diethyl carbonate were mixed in a ratio of 1:2:1 and storing in a 80° C. constant-temperature bath for two weeks, an amount of manganese eluted in an electrolyte measured with an inductively coupled plasma optical emission spectrometer is 60 ppm or more and less than 280 ppm.

16. The lithium secondary battery according to claim 15, wherein the amount of manganese is 80 ppm or more and less than 250 ppm.

17. The lithium secondary battery according to claim 16, wherein the amount of manganese is 90 ppm or more and less than 200 ppm.

18. A battery pack comprising the lithium secondary battery according to claim 7.

19. An electric vehicle comprising the battery pack according to claim 18 as a power source.

* * * * *